United States Patent
Batagllia

(10) Patent No.: US 6,302,013 B1
(45) Date of Patent: Oct. 16, 2001

(54) FILLING DEPOSITOR FOR RAVIOLI MACHINES

(76) Inventor: John Batagllia, 98 Cardinal La., Westwood, NJ (US) 07675

( * ) Notice: Subject to any disclaimer, the term of this patent is extended or adjusted under 35 U.S.C. 154(b) by 0 days.

(21) Appl. No.: 09/764,238

(22) Filed: Jan. 19, 2001

(51) Int. Cl.$^7$ .................... A23L 1/00; A21C 9/00; A23P 1/00

(52) U.S. Cl. .............. 99/450.2; 99/450.6; 99/450.7; 425/112; 425/115

(58) Field of Search ................ 99/450.1–450.8, 99/494, 485; 425/112, 115, 122, 223, 448, 511, 512, 515, 518, 327, 362, 310; 264/DIG. 37

(56) References Cited

U.S. PATENT DOCUMENTS

| | | | |
|---|---|---|---|
| 1,844,142 | * | 2/1932 | Barili ................................ 99/450.2 |
| 2,001,792 | * | 5/1935 | Lombi ................................ 99/450.2 |
| 2,227,728 | * | 1/1941 | Lombi ................................ 99/450.2 |
| 2,774,313 | * | 12/1956 | Lombi ................................ 99/450.2 |
| 2,905,105 | * | 9/1959 | Lombi ................................ 99/450.6 |
| 3,373,702 | * | 3/1968 | Quilici et al. ..................... 99/450.5 |
| 3,605,641 | * | 9/1971 | Shuster .............................. 99/450.7 |
| 3,930,441 | * | 1/1976 | Ohkawa ........................... 425/223 X |
| 4,160,634 | * | 7/1979 | Huang ................................ 99/450.6 |
| 4,848,218 | * | 7/1989 | Battaglia ........................... 99/450.7 |
| 4,941,402 | * | 7/1990 | D'Alterio .......................... 99/450.6 |
| 5,010,807 | * | 4/1991 | Anderson et al. ................ 99/450.6 |
| 5,590,589 | * | 1/1997 | Battaglia ........................... 99/450.7 |

* cited by examiner

Primary Examiner—Timothy F. Simone
(74) Attorney, Agent, or Firm—Richard A. Joel, Esq.

(57) ABSTRACT

A filling depositor for ravioli producing machines particularly with thick or chunky fillings comprises a rotary valve assembly connected to the filling tubes, which are fed by a positive displacement gear pump. The rotary valve assembly includes a rotary valve which is driven and synchronized with a gearing of the ravioli machine and includes machined openings in a shaft which match the shape of the ravioli forming die. The shaft is rotated into alignment with the ravioli die to provide the desired filling thorough slots in a housing and appropriate cut-off of the filling operating at a high speed.

8 Claims, 4 Drawing Sheets

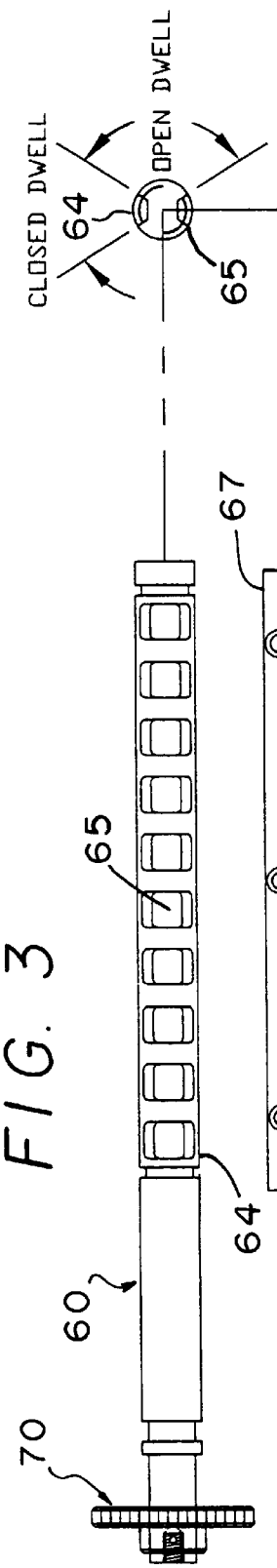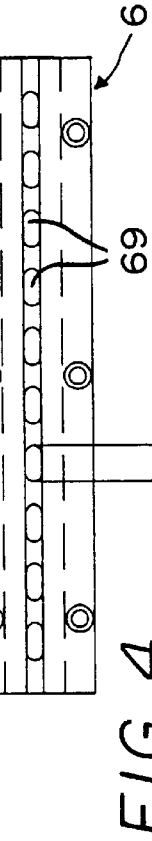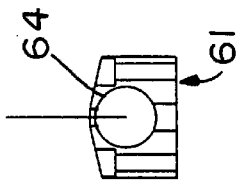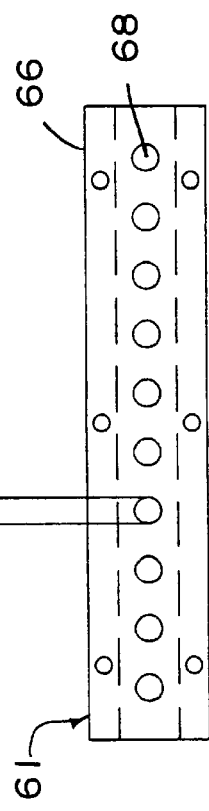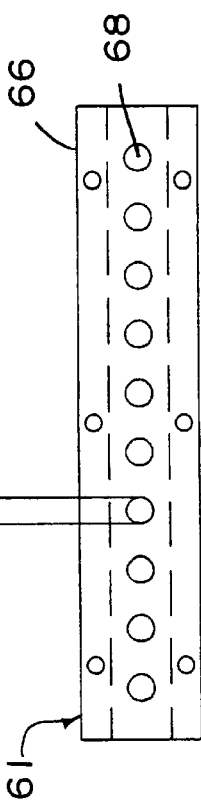

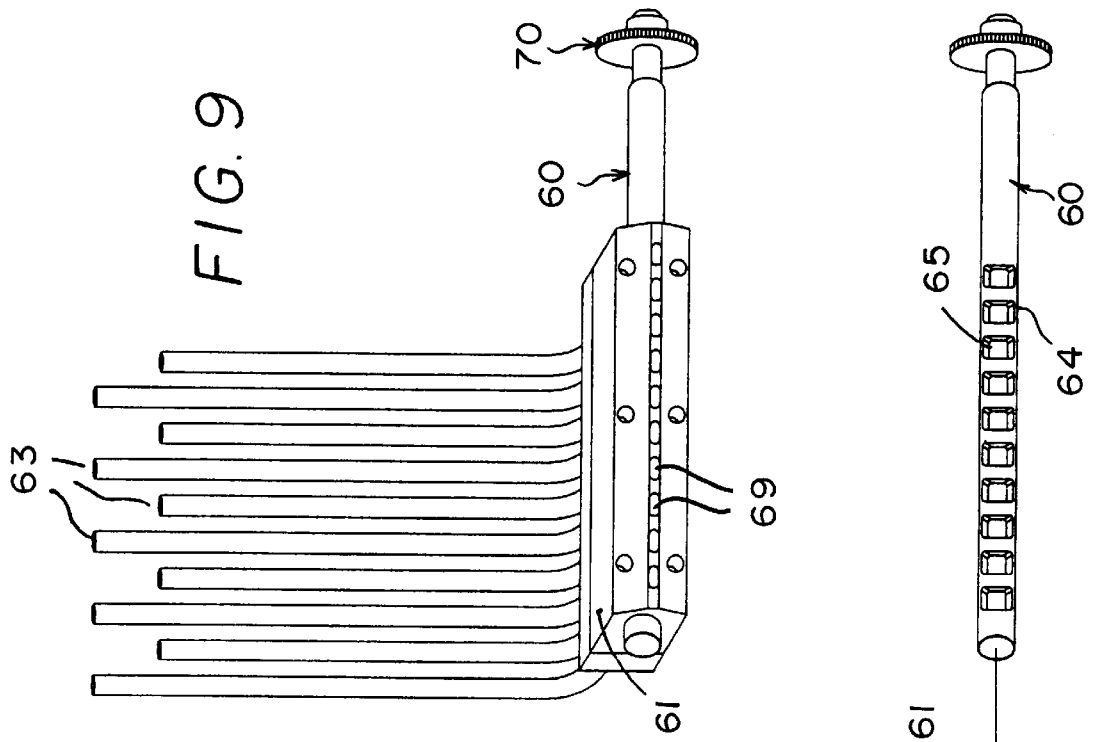
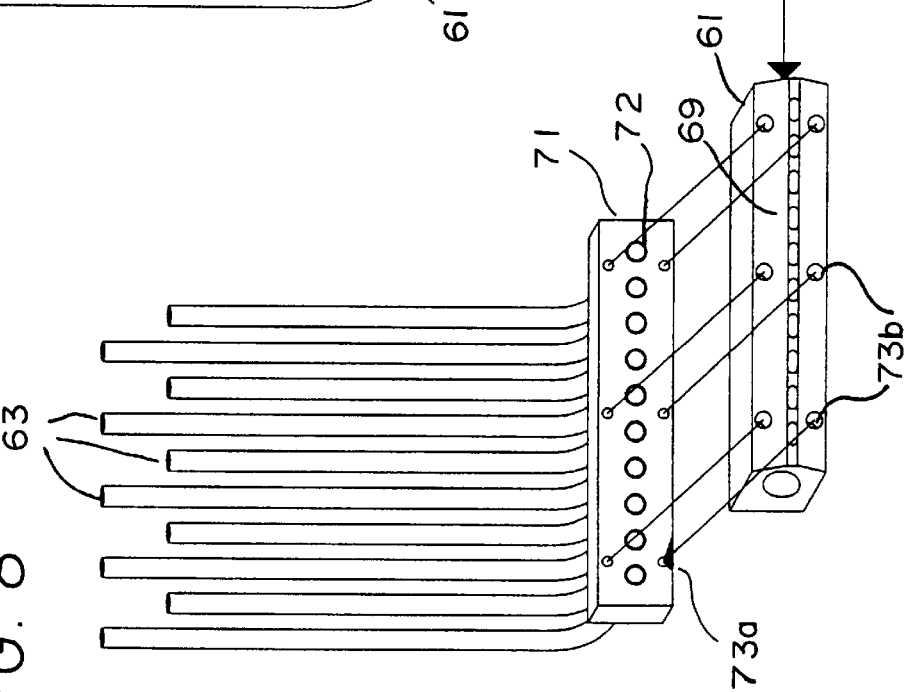

FILLING DEPOSITOR FOR RAVIOLI MACHINES

CROSS-REFERENCE TO RELATED APPLICATIONS

None

STATEMENT REGARDING FEDERALLY SPONSORED RESEARCH OR DEVELOPMENT

Research and development of the present invention and application have not been federally sponsored, and no rights are given under any Federal program.

REFERENCE TO A MICROFICHE APPENDIX

Not applicable.

BACKGROUND OF THE INVENTION

1. Field of the Invention

This invention relates to apparatus for producing ravioli and particularly to an apparatus for providing reliable mechanical cut-off between filler deposits, improved sealing of product and the capability to use different types of fillings such as thicker and chunkier types.

2. Description of the Related Art Including Information Disclosed Under 37 CFR §§ 1.97–1.98

The prior art includes machines for automatically forming pastry such as U.S. Pat. No. 3,930,441 and pie or ravioli filling apparatus such as U.S. Pat. Nos. 1,844,142, 2,001,792 and 2,774,313 to Lombi which disclose a somewhat more relevant apparatus for ravioli manufacturing. Applicant's U.S. Pat. No. 4,848,218 discloses a machine for making ravioli and an improved fill mechanism which is basically the standard for the industry. Another relevant prior art patent is applicant's U.S. Pat. No. 5,590,589 which discloses apparatus for producing specialty ravioli configurations.

The original design of filling tube assembly was to remain stationary at a very close distance from the ravioli forming die. This created "drag" of filling product across the sealing area. Later an improved version of that design was developed that allowed the nozzle to "rock" back and forth. This would create a break between deposits as the nozzle came in alignment with the ravioli die filling pockets. This design can be seen in U.S. Pat. No. 4,848,281 issued Jul. 18, 1989 entitled Machine Ravioli Having an Improved Fill Mechanism. However, this design works well at slower speeds. Once you increase the speed of the machine there is loss of control at higher limits.

This application represents a new and improved ravioli making apparatus wherein a rotary valve assembly is connected to the filling tubes. The assembly includes a stainless steel shaft with pockets which match the pockets in the ravioli die. The rotary valve is driven and synchronized with the gearing shown in U.S. Pat. No. 4,848,218 providing unique advantages over the prior art apparatus.

SUMMARY OF THE INVENTION

This invention relates to an apparatus for producing ravioli and particularly to a filling depositor for producing ravioli with thick or chunky fillings. The subject depositor is also advantageous for conventional fillings since it provides a true positive break between indexed deposits from a filler pump and can operate at high speeds.

The filling depositor comprises a rotary valve assembly connected to the filling tubes, which are fed by a positive displacement gear pump. The rotary valve assembly includes a rotary valve which is driven and synchronized with the gearing of the ravioli machine. Thus it can be offered as an upgrade on existing machines from different manufacturers.

The rotary valve has openings machined into it to match the shape of the ravioli forming die. In the case of a square shaped ravioli die, which has ten (10) square pockets across the die face or ten (10) columns and five (5) rows about the circumference, the rotary valve shaft would have two (2) rows of ten (10) square pockets along the length of the shaft at 180° apart. The stainless steel shaft rides in a plastic housing that has openings on two (2) sides. One side has ten (10) simple round openings which allow the filling fed by the pump to enter the ten (10) shaft cavities. The opposite side of the plastic housing includes ten (10) simple slots corresponding to the filling deposit inside of the filled ravioli. The shaft is rotated into alignment with the ravioli die to provide the desired filling and appropriate cut-off at a high speed.

Accordingly, an object of this invention is to provide a new and improved depositor assembly for ravioli machines.

Another object of this invention is to provide a new and improved high speed depositor for ravioli machines which can provide thick and chunk fillings.

A further object of this invention is to provide a new and improved depositor which provides a true positive break between indexed deposits from the filler pump.

A still further object of this invention is to provide a new and improved depositor which may be driven and synchronized with existing ravioli machines.

A more specific object of this invention is to provide a new and improved ravioli depositor which comprises a rotary valve assembly having a shaft with openings matching the pockets of the ravioli die which is then rotated in synchronization with the ravioli die to fill the pockets therein and provide a positive cut-off.

BRIEF DESCRIPTION OF THE DRAWINGS

The above and other objects of the invention may be more readily seen when viewing in conjunction with the accompanying drawings wherein:

FIG. 3 shows the depositor shaft of the present invention;

FIG. 3a shows the various open and closed positions of the shaft in an end view;

FIG. 4 shows a front view of the plastic housing showing slotted openings;

FIG. 5 is a top view of the plastic housing;

FIG. 6 is a rear view of the plastic housing showing round openings;

FIG. 7 is a side view of FIG. 4;

FIG. 8 is an exploded view of the filler depositor; and,

FIG. 9 is an assembled view of FIG. 8.

DETAILED DESCRIPTION OF THE INVENTION

Figure 1:
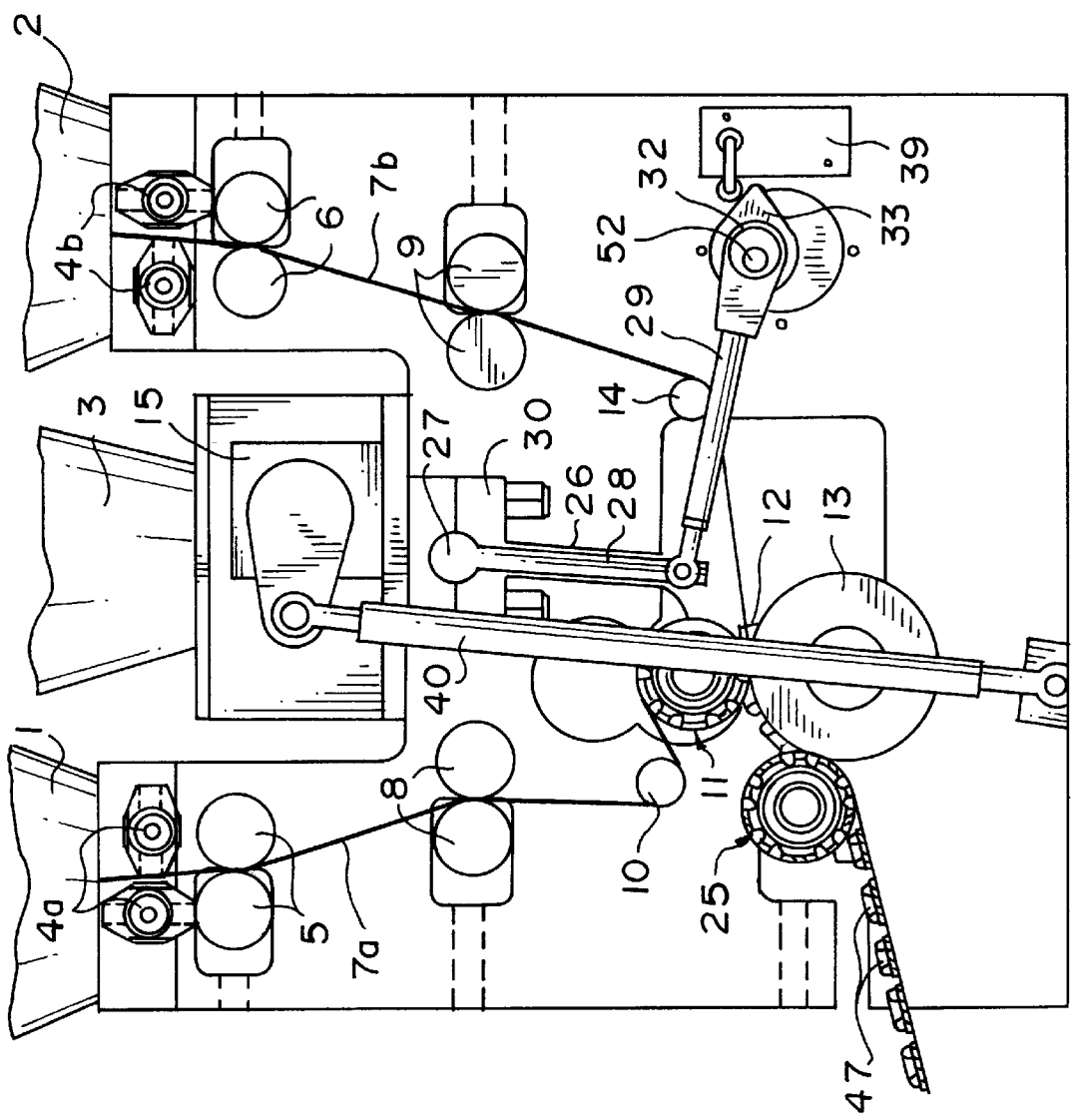
FIG. 1 shows the prior art ravioli making machine with the existing filler system.
Figure 2:
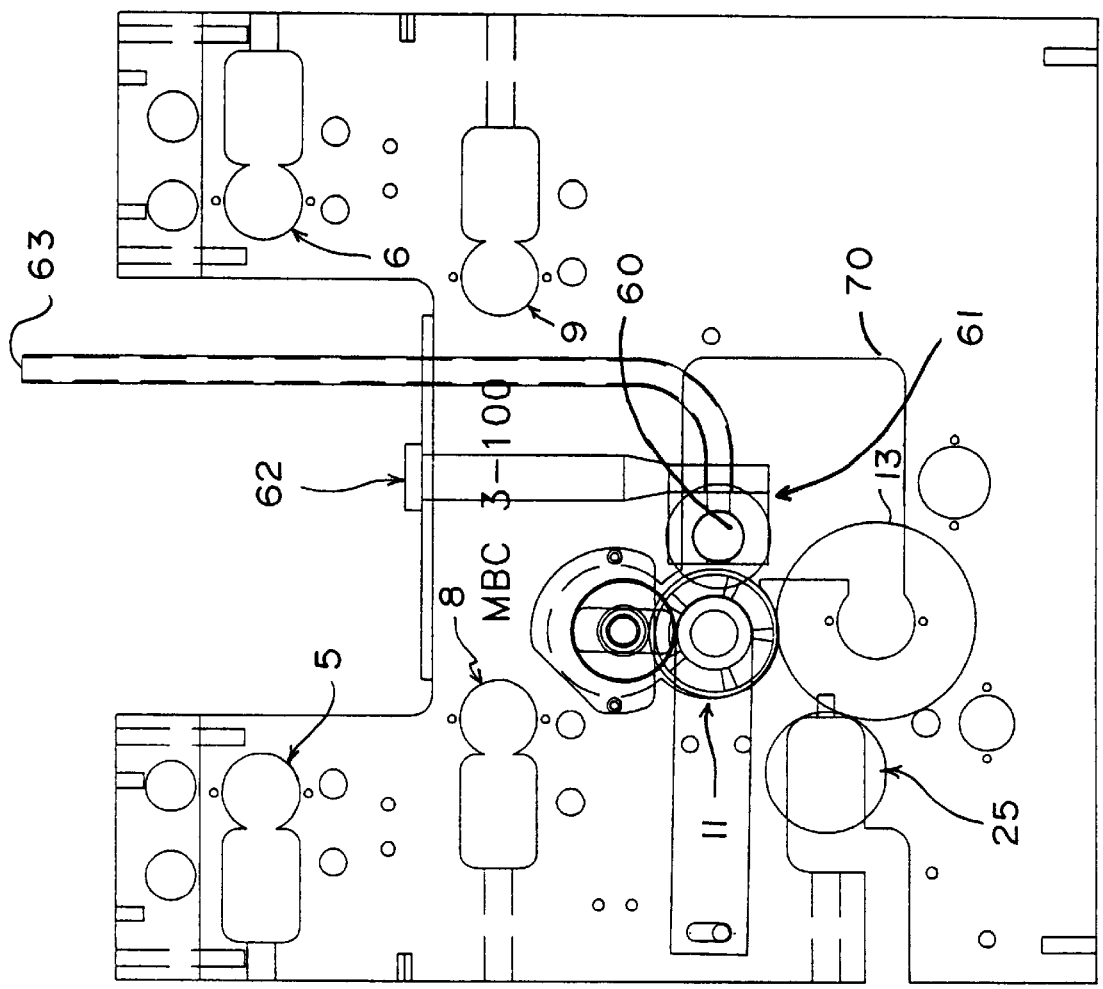
FIG. 2 shows the ravioli making machine of FIG. 1 with the unique filler depositor of this invention.

Referring now to the drawings, FIG. 1 discloses the prior art ravioli machine shown in U.S. Pat. No. 4,848,218 that is manufactured by MBC Food Machinery Corporation of Hackensack, N.J. and is the industry standard. FIG. 2 discloses the unique filling depositor for use with this machine. However, only the filling depositor is shown in detail and reference must be made to FIG. 1 for further details.

The ravioli machine of FIG. 1 comprises two dough hoppers 1 and 2 with a filler mateial hopper 3 located therebetween. Chunks of unformed dough are fed through kneader bars 4a and 4b, then through a pair of primary forming rolls 5 and 6 which rough form the dough into sheets 7a and 7b. The sheets 7a, 7b proceed through secondary forming rolls 8 and 9 which size the sheets 7a, 7b to the proper thickness. The dough sheet 7a from hopper 1 is fed around a tension idler 10 over the top of the female die roll 11 and around the die roll 11 downwardly to a nip 12 formed by this female die roll 11 and a drum roll 13 which cooperates therewith. The dough sheet 7b from dough hopper 2 is simultaneously fed through the secondary forming rolls 9, around tension idler 4 and into the nip 12 where the dough sheet 7b is combined with the filler material 49 and the upper sheet 7a. The cutter 25 segments the sheets into individual ravioli 47.

A gear pump 15 is located at the outlet of the filler material hopper 3 to intermittently feed filler material to a plurality of feed tubes 26. The feed tubes 26, are rotatably mounted on a journal 27. The journal 27 can be turned by means of pivot rod 28. However, since the motion of the pivot rods 28 is limited by cam follower rod 29, the motion in the journal 27 is limited to a back and forth oscillating motion.

The follower rod 29 rides on cam 32, which causes an oscillating motion of the follower rod 29 which is transmitted to the journal 27, through the pivot rod 28. Since, both cam 32 and cam 33 are mounted on the same shaft 52, the cams 32, 33 can be adjusted with respect to one another so as to coordinate the positioning of the feed tubes 26, and the activation of the gear pump 15. The gear pump 15 is actuated by means of an air motor (not shown). The motor being energized by the tripping of switch 39 by cam 33. The gear pump 15 is driven by means of push rod 40 which is connected to an air motor.

The unique filling depositor of the present invention as shown in FIG. 2 comprises a stainless steel shaft 64 which is mounted in a plastic housing 61 adjacent the female ravioli die 11. The housing 61 is held in position within the machine by mounting bracket 62.

A positive displacement gear pump (not shown) feeds filling material through filling tubes 63 to the rotary valve 60 comprising the shaft 64 with apertures 65. The rotary valve 60 is driven and synchronized with the machine gearing. Thus the filling depositor can be used with existing machines as an upgrade. The rotary valve assembly can also be used with a variety of pumps such as after market vacuum stuffer machines that are capable of moving thicker, chunky fillings.

In the original prior art ravioli making machine, the filling tube assembly was to remain stationary at a very close distance from the ravioli forming die 11. This created a "drag" of filling material across the sealing area. The machine of U.S. Pat. No. 4,848,212 described above was designed to overcome this problem. The nozzle was allowed to rock back and forth to create a break between the deposits of filler material as the nozzle of feed tube 26 came into alignment with the ravioli die filling pockets. While this improved machine works well at lower speeds, there is a loss of control at higher speeds. Hence, the need for the present invention.

As shown in FIG. 3, the rotary valve 60 comprises a stainless steel shaft 64 that has openings 65 machined into it to match the shape of the ravioli forming die 11. For example, a square die 11 has ten (10) square pockets across the face of the die 11 or ten (10) columns and five (5) rows around the circumference. The corresponding shaft 64 of the rotary valve 60 has two (2) rows of ten (10) square pockets along the length of the shaft 64 at 180° apart. The shaft 64 rides in a plastic housing 61 that has openings 65 on both sides 66, 67. One side 66 may have ten (10) simple round openings 68 which allow filling from the pump to enter the shaft's ten (10) cavities. The opposite side 67 may have ten (10) simple slots 69 wherein the slot dimensions would resemble the filling deposit shape inside the filled ravioli.

Since the ten (10) pockets in the stainless steel shaft 64 match the pockets of the ravioli die 11, the stainless steel shaft 64 can be rotated 180° (one row of pockets) and it will equal the 72° rotation (one row of pockets) required to align the ravioli die 11 that has five (5) rows around its circumference. This synchronization is achieved by using spur gears of specific ratios. No additional apparatus such as air cylinders, solenoid valves or additional electrical wiring is required and the operation remains simple. The plastic housing 61 and internal shaft 64 are secured to a stainless steel plate 70 that is mounted in front of the ravioli die's 11 ten (10) pockets. The filling tubes 63 are secured to a block 71 with openings 72 corresponding to the housing 61 and secured thereto with mounting means through apertures 73a and 73b. All of these items can be easily removed for normal daily cleaning.

In operation, the filler material would be fed through the round openings 68 to the shaft pockets 65. The shaft 64 rotates with gearing 70 forcing filling material from pockets 65 through slots 69 into corresponding pockets on the ravioli die 11. The sequence with a closed dwell and an open dwell is shown in FIG. 3a. The rapid positive rotation of the shaft 64 feeding the die pockets of the female die 11 is distinctly unique and advantageous.

Another major advantage to this rotary style valve is that one can machine in a matched image of the ravioli die filling pockets. The embodiment described herein uses "square" shapes as an example. This is the easiest of the ravioli shapes to fill because the filling path is "straight". This makes it easy to control filling front to back and side to side. The more difficult shape is round. If you machine a circle on a ravioli die and use a square opening in the stainless steel filling shaft, the end result is a round pasta dough shape with a straight filling portion inside (empty areas remain on both sides of the filling portion). This is usually not accepted or not preferred. A round shape may be machined on the stainless steel shaft 64 to match the round ravioli die 11; therefore, one can fill the ravioli covering the entire perimeter and leave a clean gap between deposits.

In an alternative embodiment, a servomotor may be employed instead of synchronized gearing (spur gears) 60. The servomotor may be programmed to rotate the shaft at predetermined speeds and angles to provide the desired ravioli filling deposit.

While the invention has been explained by a detailed description of certain specific embodiments, it is understood that various modifications and substitutions can be made in any of them within the scope of the appended claims, which are intended also to include equivalents of such embodiments.

What is claimed is:

1. A filling depositor for a ravioli-making machine including a female ravioli die having a plurality of aligned pockets in predetermined rows which comprises:

a rotary valve comprising an elongated shaft having an array of openings on opposite sides of the shaft which correspond to the pockets on the ravioli die;

a plastic housing having a plurality of round openings on one side of the housing and a plurality of corresponding slots on the opposite side of the housing, each slot corresponding to an opening on the shaft;

a plurality of filling tubes each connected to a round opening in the housing;

gear means connected to the shaft to rotate said shaft; and, wherein the rotary shaft is mounted adjacent the ravioli die so that filling is forced through the slots in the plastic housing into the pockets of the ravioli die.

2. A filling depositor for a ravioli-making machine including a female ravioli die having a plurality of pockets in accordance with claim 1 wherein:

the shaft openings comprise two rows of ten (10) spaced parallel openings corresponding to the pockets on the ravioli die, said rows being spaced 180° apart.

3. A filling depositor for a ravioli making machine including a female ravioli die having a plurality of pockets in accordance with claim 1 further including:

a mounting bracket mounted to the ravioli machine at one end and to the plastic housing at the other end to support the rotary valve.

4. A filling depositor for a ravioli making machine including a female ravioli die having a plurality of pockets in accordance with claim 1 further including:

gear means for driving the ravioli machine and wherein the rotary valve is coupled thereto to be driven and synchronized with the machine gearing at high speeds.

5. A filling depositor for a ravioli making machine including a female ravioli die having a plurality of pockets in accordance with claim 1 further including:

a positive displacement pump connected to the filling tubes to force thick or chunky fillings through the filling tubes.

6. A filling depositor for a ravioli-making machine including a female ravioli die having a plurality of pockets in accordance with claim 1 wherein:

the female ravioli die includes a plurality of pockets in five rows located 72° apart.

7. A filling depositor for a ravioli-making machine including a female ravioli die having a plurality of pockets in accordance with claim 2 wherein:

the shaft opening arrays located 180° apart correspond to five (5) rows of pockets on the ravioli die located 72° apart and are synchronized to fill the die pockets.

8. A filling depositor for a ravioli-making machine including a female ravioli die having a plurality of aligned pockets in predetermined rows wherein:

an elongated shaft having a plurality of openings corresponding to the pockets on the ravioli die;

a plastic housing having a plurality of round openings on one side of the housing and a plurality of corresponding slots on the opposite side of the housing, each slot corresponding to an opening on the shaft;

a plurality of filling tubes each connected to a round opening in the housing;

a servomotor coupled to the elongated shaft to rotate said shaft at predetermined variable speeds and angles;

wherein the rotary shaft is mounted adjacent the ravioli die so that filling is forced through the slots into the pockets of the ravioli die.

\* \* \* \* \*